United States Patent [19]

Suh

[11] Patent Number: 5,867,224
[45] Date of Patent: Feb. 2, 1999

[54] TIME RESET AND DISPLAY METHOD FOR AN INTELLIGENT TELEVISION

[75] Inventor: Moon-hwan Suh, Seoul, Rep. of Korea

[73] Assignee: Samsung Electronics Co., Ltd., Kyungki-do, Rep. of Korea

[21] Appl. No.: 707,443

[22] Filed: Sep. 3, 1996

[30] Foreign Application Priority Data

Sep. 1, 1995 [KR] Rep. of Korea ................... 1995 28893

[51] Int. Cl.$^6$ .............................. H04N 5/44; H04N 5/445
[52] U.S. Cl. ........................... 348/553; 348/564; 348/569
[58] Field of Search ................................... 348/553, 563, 348/564, 569, 460, 730; 386/46, 83; H04N 5/44, 5/445

[56] References Cited

U.S. PATENT DOCUMENTS 5,430,493  7/1995  Kim ......................................... 348/564
5,721,593  2/1998  Suh ......................................... 348/564

Primary Examiner—Sherrie Hsia
Attorney, Agent, or Firm—Sughrue, Mion, Zinn, Macpeak & Seas, PLLC

[57] ABSTRACT

In the present invention, when power is restored after a loss of power; an intelligent TV can receive communication services with correct current time information by displaying the clock set menu for resetting the current time by (a) checking for the presence of time information to determine whether there has been a loss of power; (b) displaying a clock set menu screen to enable resetting of the current time if a loss of power is detected in the step (a); and (c) transmitting the reset current time information to the information signal processor of the intelligent TV. Also, in the present invention, a message alerting the user that the current time should be reset gives the user the option to reset the current time when power is restored after a loss of power, by (aa) checking for the presence of time information to determine whether there has been a loss of power; (bb) displaying a message indicating that the current time should be reset if a loss of power is detected in step (aa); (cc) resetting the current time by displaying the clock set menu screen in accordance with a key input; and (dd) transmitting the reset current time data to the information signal processor of the intelligent TV.

17 Claims, 4 Drawing Sheets

TIME RESET AND DISPLAY METHOD FOR AN INTELLIGENT TELEVISION

BACKGROUND OF THE INVENTION

The present invention relates to a time reset and display method for an intelligent television. More particularly, the invention relates to a method to adjust the current time in an intelligent television, which is capable of receiving communication services, by displaying a clock set menu screen when current time data is lost due to a power failure, etc.

An intelligent TV receives communication services through a connection to a value added communication network (VAN). The intelligent TV includes an information signal processor for receiving information communication data (hereinafter, information data) when the intelligent TV is connected to a value added network, and for outputting information R, G, B signals and a switching control signal in order to display the information data on the screen. The intelligent TV selects and displays information R, G, B signals processed in the information signal processor or TV R, G, B signals processed in a TV signal processor depending on the switching control signal output from the information signal processor.

Because the intelligent TV makes it possible to view several communication services transmitted through value added networks, such as stock quotes, news services, weather, and TV program listings on a TV screen, even persons who are not familiar with the use of computers can easily receive such communication services.

In the intelligent TV, an information signal processor continuously receives time information from a TV microcomputer to update the time information. The information signal processor also operates to display the current time on the screen when a user presses a time display key. The current time display of the intelligent TV is an important factor in receiving communication services, and the display of correct time is also essential.

However, if the current time data is lost due to a power failure, the current time cannot be accurately displayed when power is restored. Unless a user checks the time stored in the TV microcomputer by pressing a time display key after the power is restored, the time information in the TV microcomputer is not displayed on the screen. Therefore, the current time cannot be verified for correctness.

SUMMARY OF THE INVENTION

In order to solve the above problem, an object of the present invention is to provide a time reset and display method in an intelligent TV. By displaying a clock set menu on the screen when power is restored after a power failure, a user is able to adjust the current time.

Another object of the present invention is to provide a time reset and display method in an intelligent TV for alerting the user that time data has been lost by providing a message on the screen so that the user can adjust the time data when power is restored after a power failure.

To achieve the above objects, there is provided a time reset and display method for an intelligent TV which receives communication services, in which the TV has an information signal processor for recognizing a communication mode key, for receiving communication information from a value added network when the TV is connected to the value added network via a line, and for decoding the communication information. The TV also has a microcomputer for transmitting current time data to the information signal processor. The method comprises the steps of: (a) checking for the presence of time information to determine whether there has been a loss of power; (b) displaying the clock set menu screen for resetting the current time if a loss of power is detected in the step (a); and (c) transmitting current time information to the information signal processor.

Additionally, there is provided a time reset and display method for an intelligent TV which receives communication services, in which the TV has an information signal processor for recognizing a communication mode key, for receiving communication information from a value added network when the TV is connected to the value added network via a line, and for decoding the communication information. The TV also has microcomputer which transmits current time data to the information signal processor. The method comprises the steps of: (a) checking for the presence of time information to determine whether there has been a loss of power; (b) displaying a message indicating that the current time should be reset if a loss of power is detected in step (a); (c) displaying the clock set menu screen for resetting the current time in accordance with a key input; and (d) transmitting current time data to the information signal processor.

DETAILED DESCRIPTION OF THE INVENTION

Figure 1:
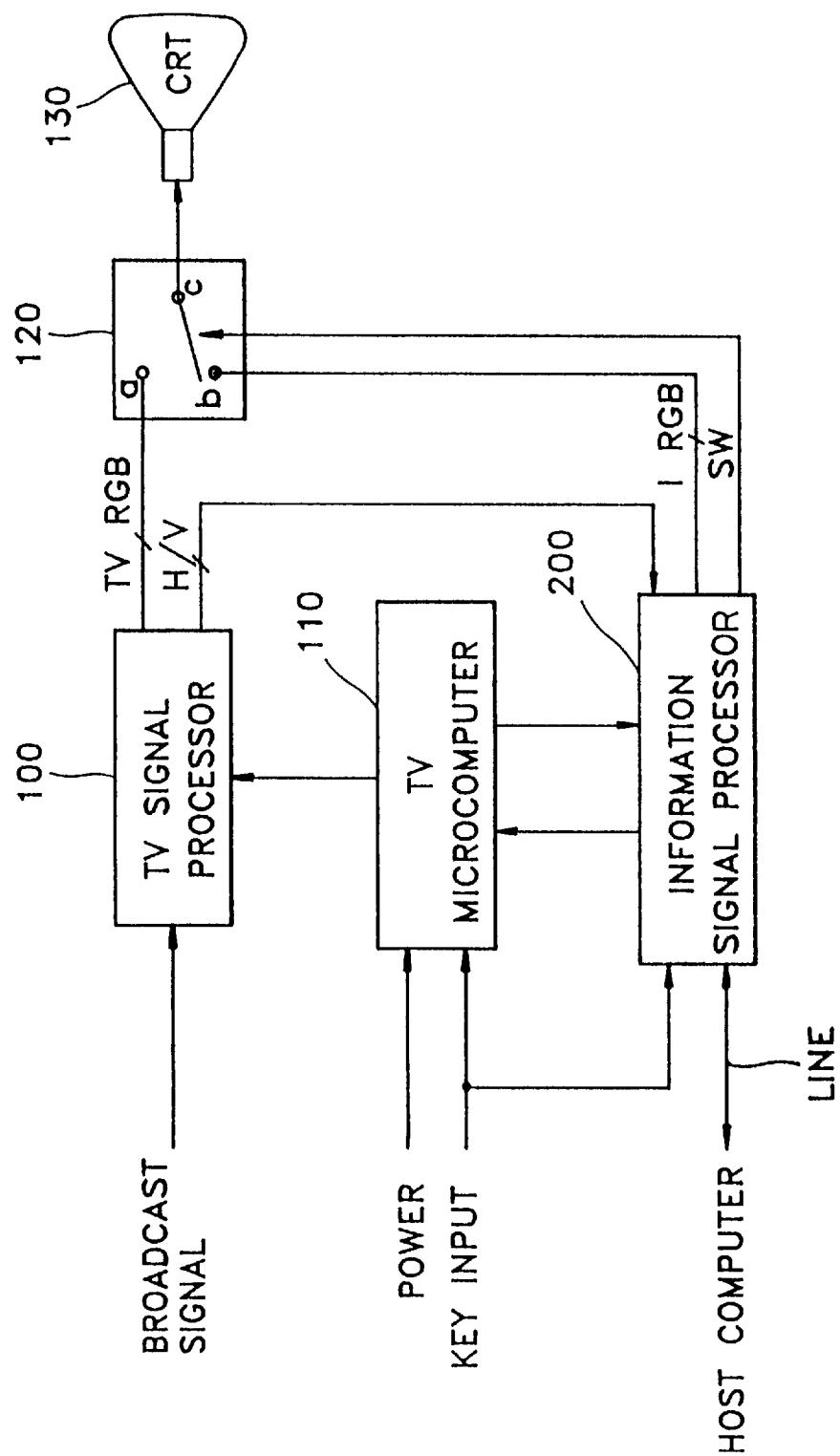
FIG. 1 is a block diagram of an intelligent TV which performs the time reset and display method according to the present invention.

FIG. 1 is a block diagram of an intelligent TV for carrying out the method according to the present invention.

The intelligent TV of FIG. 1 includes a TV signal processor 100, a TV microcomputer 110, an information signal processor 200, a switching device 120, and a cathode ray tube (CRT) 130.

The TV signal processor 100 processes a broadcast channel signal selected through a tuner (not shown) and then outputs TV R, G, B signals TV RGB and horizontal/vertical synchronization signals H/V.

The information signal processor 200 receives information data from a value added network (VAN) via a line, which may be a telephone line or a coaxial cable connected to a local cable service company providing communications services. The information signal processor recognizes a communication mode key input and then connects the intelligent TV to the VAN. The information signal processor 200 decodes the information data to output information R, G, B signals I RGB in synchronization with the horizontal/vertical synchronization signal output from the TV signal processor 100. The information signal processor also generates a switching control signal SW.

Switching device 120 selects the TV R, G, B signals TV RGB processed in TV signal processor 100 or information R, G, B signals I RGB processed in the information signal processor 200 according to the switching control signal SW generated in the information signal processor 200. The selected signal is displayed on the CRT 130.

TV microcomputer 110 controls the TV signal processor 100 by recognizing a key input for a TV mode, and serially transmits and receives data to and from the information signal processor 200.

In the manner described above, the intelligent TV having the above structure can display either information signals on the screen during communication mode or TV broadcast signals on the screen during TV mode.

In the described intelligent TV, TV microcomputer 110 transmits current time data, i.e., year, month, date, hour, minute, and second, to the information signal processor 200 on demand by the information signal processor 200. The TV microcomputer 110 also makes it possible for the information signal processor 200 to receive the current time periodically by transmitting time data to the information signal processor 200 during a certain interval of time, e.g., every 100 ms.

Thus, when a user requests the current time to be displayed, the information signal processor 200 decodes a key input, requests the current time from the TV microcomputer 110, and then displays the current time on the CRT 130. The information signal processor 200 also periodically renews the current time by receiving the current time information from the TV microcomputer 110.

Both the time data from the TV microcomputer 110 to the information signal processor 200 and the current time request information from the information signal processor 200 to the TV microcomputer 110 are transmitted as serial data.

The operation described above is true for the case when power is continuously applied. However, if the time data is lost due to a loss of power to the TV microcomputer 110, the correct time cannot be displayed unless the clock is reset.

Therefore, in the present invention, a clock set menu or a message notifying the user to check the current time is displayed when the power is restored to the intelligent TV after a loss of power.

Figure 2:
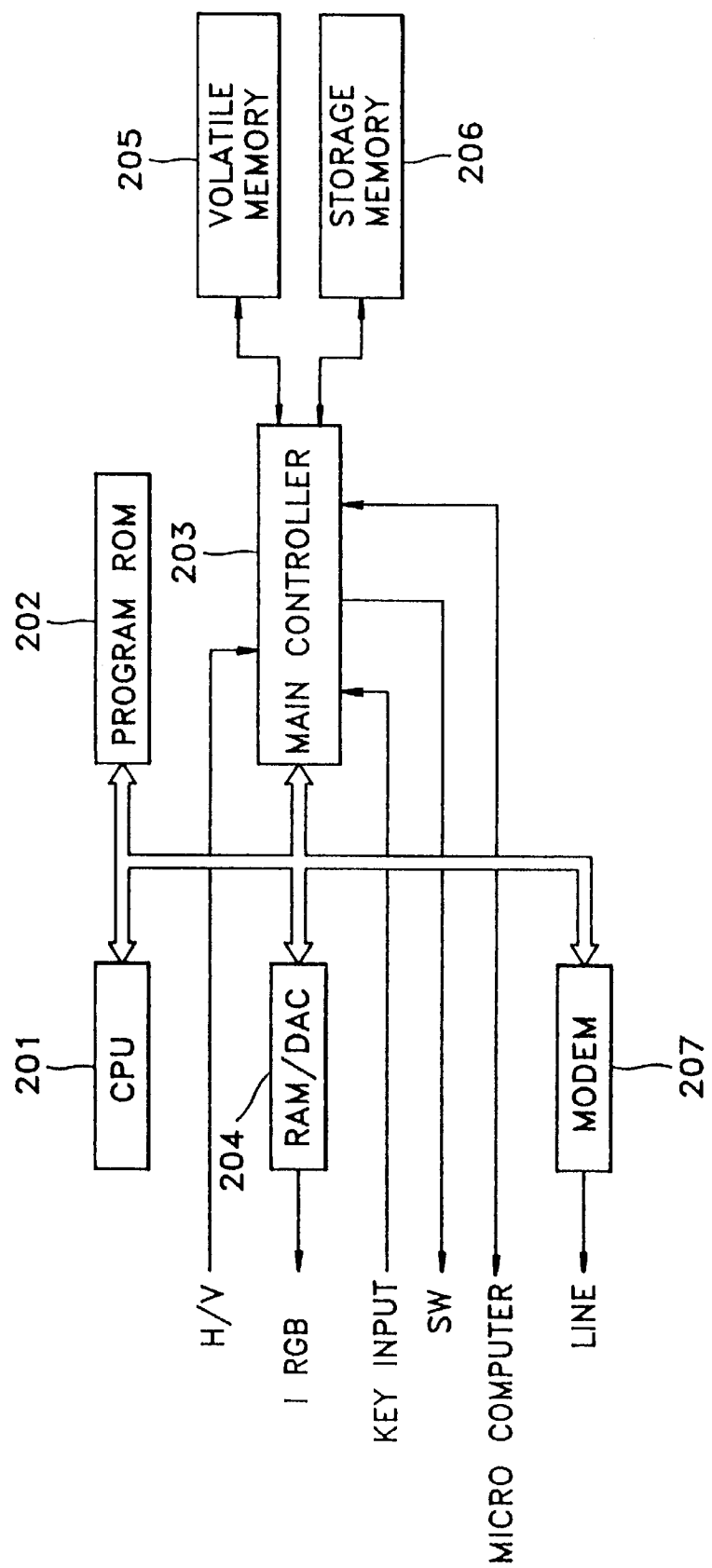
FIG. 2 is a detailed block diagram of the information signal processor shown in FIG. 1.

FIG. 2 shows the information signal processor 200 in greater detail. The signal processor 200 includes a CPU 201, a program ROM 202, a main controller 203, a RAM/DAC 204, a volatile memory 205, a storage memory 206, and a modem 207.

The CPU 201 controls the other functional blocks of the information signal processor 200, including data transmission, data calculations, etc., according to programs stored in the programmable ROM 202 and control signals generated from the main controller 203. Data processing and the control of the peripheral units carried out by the CPU 201 are accomplished based on interrupt signals. The interrupt signals are transferred from the main controller 203 and the modem 207.

In the main controller 203, requests for interrupts are generated by several tasks, including the reception of an infrared key input data from a transmitter (not shown), a vertical blanking signal, the operation of an internal timer for a designated operation, and the reception of serial data from the TV microcomputer 110. In these cases, the main controller 203 generates and transmits interrupt signals to the CPU 201. The CPU executes a corresponding task whenever an interrupt signal is generated.

The program ROM 202 stores data and programs for the operation of the system, including decoding programs and font data. The CPU 201 reads data from the program ROM 202 and executes a series of corresponding operations.

In the communication mode, the information signal processor 200 operates as follows.

When a communication mode key input is recognized, the main controller 203 transmits an interrupt signal to the CPU 201, and then the CPU 201 executes operations of the communication mode in accordance with programs in the program ROM 202.

The main controller 203 recognizes and transmits to the CPU 201 telephone number data in accordance with a key input. The CPU 201 then transfers the telephone number data to the modem 207, and the modem 207 connects the information signal processor 200 to the VAN by dialing the number. Here, the telephone line can be replaced by a coaxial cable connected to a cable service provider offering VAN service.

If a communication command is input when the line is connected, data corresponding to a communication command is transmitted to the host computer through the modem 207, and the host computer transmits information data according to the communication command.

The information data received through modem 207 are demodulated and applied to main controller 203, and the main controller 203 stores the data in a volatile memory 205.

When the information data is to be superimposed over a TV signal, the information data is read out from the volatile memory 205 in synchronization with the horizontal/vertical synchronizing signal H/V output from the TV signal processor 100 and applied to the RAM/DAC 204. The RAM/DAC 204 converts the information data into analog R, G, B signals and outputs the converted result to the second selection terminal b of the switching device 120 shown in FIG. 1.

When the information data is to be displayed on the entire screen, the information data is output through the RAM/DAC 204 to the second selection terminal b of the switching device 120 shown in FIG. 1. The data is output in synchronization with the horizontal/vertical signals H/V generated from a synchronizing signal generator in the main controller 203 and under the control of the main controller 203. The main controller 203 outputs the switching control signal SW to the switching device 120 shown in FIG. 1 in accordance with the selection of an information mode or a TV mode by recognizing a mode selection key input by the user.

On the other hand, when request for display of the current time is input, the main controller 203 transmits a control signal to the TV microcomputer 110 for requesting the current time. The main controller then receives from the TV microcomputer 110 serial data corresponding to the current time information in a predetermined period of time. The main controller 203 controls the display of time change messages and notifies the user that the time data has been lost due to a power failure and/or displays the clock set menu for resetting the time. The display of the notifying message and the clock menu depends on the presence of the current time information transmitted from the TV microcomputer 110.

Figure 3:
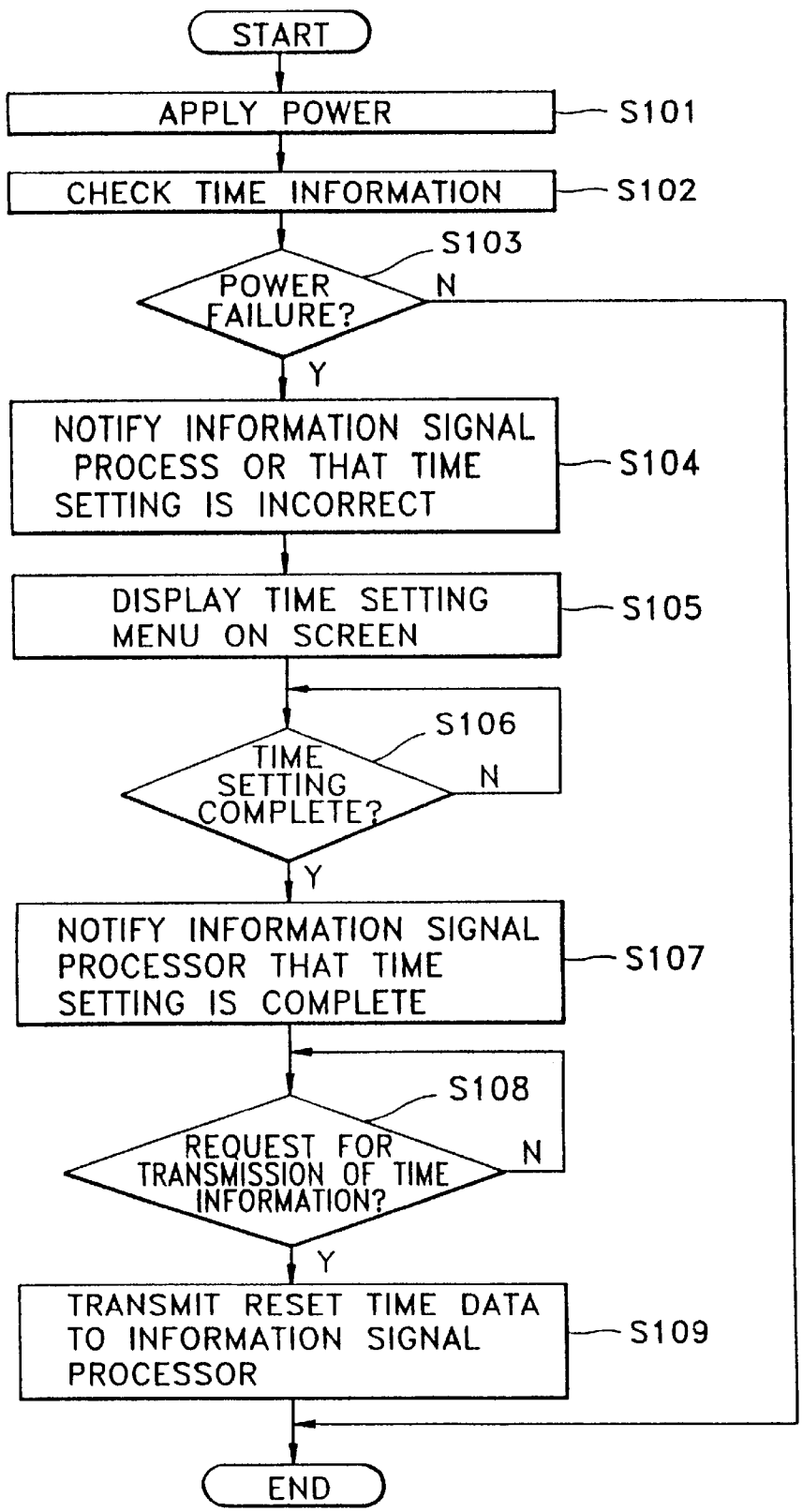
FIG. 3 is a flow chart of the time reset and display method according to an embodiment of the present invention.

FIG. 3 is a flow chart of the time reset and display method according to an embodiment of the present invention.

In FIG. 3, when power is applied (S101), TV microcomputer 110 checks the time information (S102). After the time information is checked, the system determines whether a power failure has occurred (S103). The presence of a power failure can be detected by checking for the presence of the time information. Specifically, the presence of the time information indicates that the current time does not need to be reset, but the absence of the time information indicates that the time information has been lost due to a power failure.

In the absence of a power failure, the routine ends since the current time need not be changed. If a loss of time information is detected, however, the TV microcomputer 110 transmits serial data to the information signal processor indicating that the current time is incorrect (S104).

Upon reception of the serial data indicating the loss of the current time, the signal processor 200 displays the clock set menu screen (S105). That is, the loss of time information due to a power failure forces the current time set menu to be displayed to alert the user of the data loss and to enable the user to reset the current time. If the time setting has been completed (S106), the TV microcomputer 110 notifies the information signal processor 200 of the completion of time setting (S107). Then, the clock set menu disappears.

If there is a request for transmission and/or display of the time information (S108), the reset time information data is transmitted to the information signal processor 200 (S109), and the routine ends.

The routine can be changed so that information signal processor 200 displays the reset current time information to the screen the processor receives the time information from TV microcomputer 110, regardless of the request of the user. That is, the transmission and display of the time information can be requested by a key input of the user or may be output by a program after the information signal processor 200 receives information that the time setting is complete in step S107.

Figure 4:
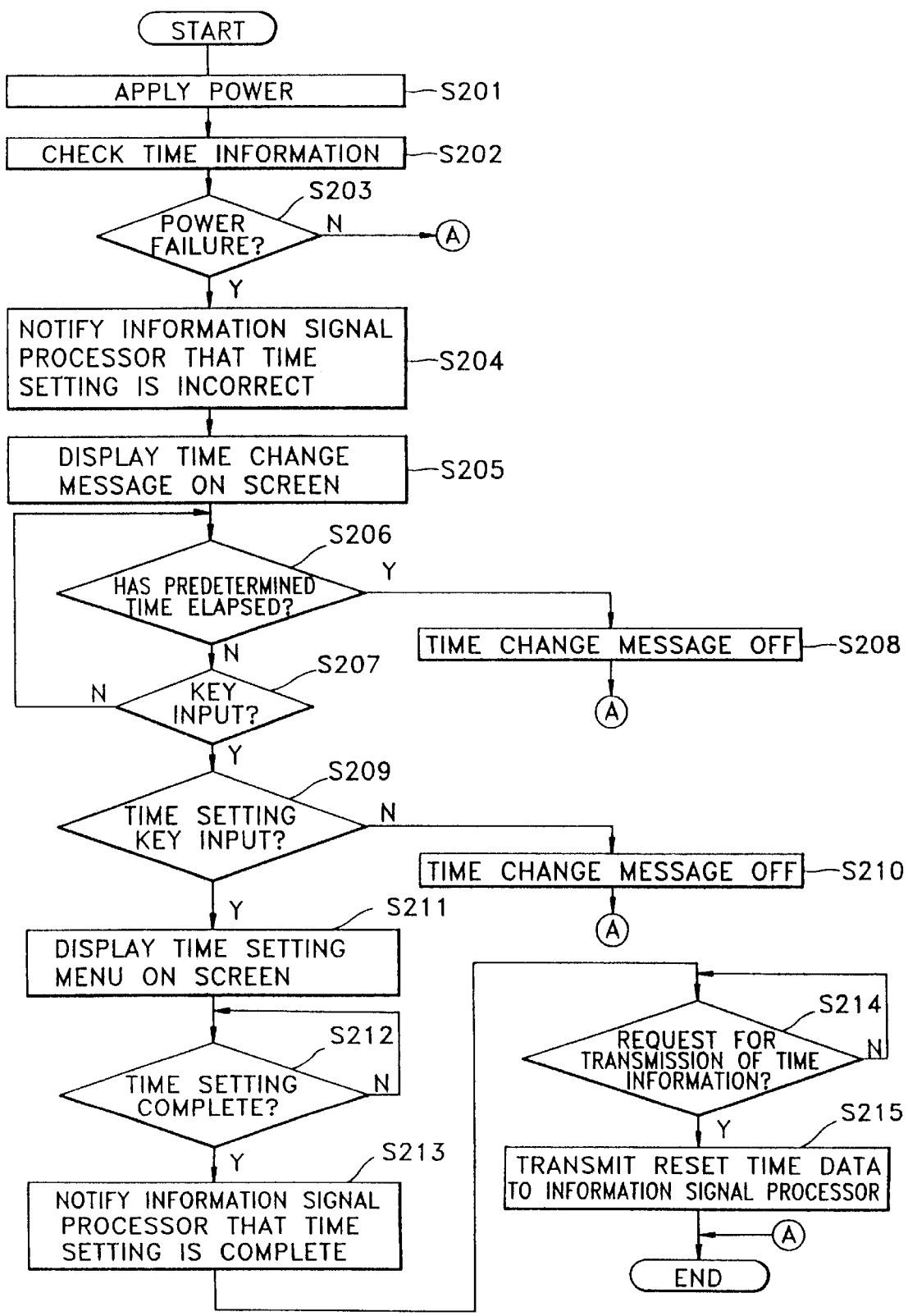
FIG. 4 is a flow chart of the time reset and display method according to another embodiment of the present invention.

FIG. 4 is a flow chart of the time reset and display method according to another embodiment of the present invention.

In FIG. 4, when power is applied (S201), TV microcomputer 110 checks the time information (S202). After the time information is checked, the system determines whether a power failure has occurred (S203).

In the absence of a power failure, the routine ends since the current time need not be changed. If a loss of time information is detected, however, the TV microcomputer 110 transmits serial data to the information signal processor indicating that the current time is incorrect (S204).

Upon reception of the serial data, the signal processor 200 displays a message on the screen indicating to the user that the time information has been lost (S205). That is, the loss of time information due to a power failure forces the message alerting the user that the current time should be reset.

After displaying the message, a determination is made as to whether a predetermined period of time has passed (S206), and a key input is monitored (S207). If there is no key input within the predetermined period of time, the message notifying the user that the current time should be reset disappears, and the routine ends (S208).

If a key input is detected before the predetermined period of time passes, it is determined whether the key input corresponds to a clock reset command (S209). If the key input is not for resetting the clock, the message disappears (S210), and the routine ends. However, if the key input is for resetting the clock, the clock set menu is displayed (S211).

Step S212 checks that the current time setting is complete. If the resetting of the current time is complete, the TV microcomputer 110 notifies the information signal processor 200 of the completion (S213), and removes the clock set menu from the display.

If there is a request for transmission of the time information (S214), the reset time information data is transmitted to the information signal processor 200 (S215), and the routine ends.

The routine can be changed so that information signal processor 200 displays the reset current time information when it receives the time information from TV microcomputer 110, regardless of the request of the user. That is, the transmission and display of the time information can be requested by a key input of the user or by a program after the information signal processor 200 receives information that the time setting is complete in step S213.

As described above, the present invention displays the clock set menu when power is restored after a power failure to enable a user to reset the current time. Thus, the intelligent TV can display communication service information with correct current time information.

Also, the present invention displays a message alerting the user that the current time should be reset so that the user recognizes the necessity of resetting the current time when power is restored after a power failure.

What is claimed is:

1. A time reset method for an intelligent TV, the TV having an information signal processor for receiving communication information from a value added network when the TV is connected to the value added network via a line and for decoding the communication information, the TV also having a TV microcomputer for transmitting current time data to the information signal processor, said method comprising the steps of:

(a) checking for the presence of time information to determine whether there has been a loss of power;

(b) displaying a clock set menu screen for resetting the current time data if a loss of power is detected in step (a); and (c) transmitting the current time data to the information signal processor.

2. The time reset method for an intelligent TV according to claim 1, wherein said method further comprises the step of (d) displaying information corresponding to the current time data transmitted to the information signal processor.

3. The time reset method of an intelligent TV according to claim 1, wherein said method further includes the steps of (d) recognizing a time information display request key input; and (e) displaying information corresponding to the current time data transmitted to the information signal processor in response to the time information display request key input.

4. A time reset method for an intelligent TV, the TV having an information signal processor for receiving communication information from a value added network when said TV is connected to the value added network via a line and for decoding the communication information, the TV also having a TV microcomputer for transmitting current time data to the information signal processor, said method comprising the steps of:

(a) checking for the presence of time information to determine whether there has been a loss of power;

(b) displaying a message indicating that the current time data should be reset if a loss of power is detected in step (a);

(c) displaying a clock set menu screen for resetting the current time in accordance with a key input; and (d) transmitting the current time data to the information signal processor.

5. The time reset method for an intelligent TV according to claim 4, wherein said step (c) comprises steps of:

(c1) recognizing a time setting key input within a predetermined period of time;

(c2) displaying the clock set menu screen when the time setting key is input; and (c3) resetting the current time in accordance with the key input.

6. The time reset method for an intelligent TV according to claim 4, wherein the method further comprises the step of (e) displaying information corresponding to the current time data transmitted to the information signal processor.

7. The time reset method for an intelligent TV according to claim 6, wherein said information displaying step (e) displays information corresponding to the current time data in accordance with a time information display request key input.

8. The time reset method for an intelligent TV according to claim 5, said method further comprising the step of displaying information corresponding to the current time in accordance with a time information display request key input.

9. A time reset method for an intelligent TV, the TV having an information signal processor for receiving and processing communication signals and a TV microcomputer for transmitting current time data to the information signal processor, said method comprising the steps of:

(a) checking for the presence of time information in the information signal processor to determine whether there has been a loss of power;

(b) displaying a time reset screen for prompting a user to reset the current time data if a loss of power is detected in step (a);

(c) transmitting the current time data from the TV microcomputer to the information signal processor.

10. A time reset method for an intelligent TV according to claim 9, wherein said time reset screen comprises a clock set menu.

11. A time reset method for an intelligent TV according to claim 10, wherein said method further comprises the step of (d) displaying information corresponding to the current time data transmitted to the information signal processor.

12. A time reset method for an intelligent TV according to claim 10, wherein said method further includes the steps of (d) recognizing a time information display request key input; and (e) displaying information corresponding to the current time data transmitted to the information signal processor in response to the time information display request key input.

13. A time reset method for an intelligent TV according to claim 9, wherein said time reset screen comprises a message indicating that the current time data should be reset, and said displaying step (b) further comprises displaying a clock set menu screen for resetting the current time data in accordance with a key input.

14. A time reset method for an intelligent TV according to claim 13, wherein said displaying step (b) further comprises the steps of:

(C1) recognizing a time setting key input within a predetermined period of time;

(c2) displaying the clock set menu screen in accordance with the time setting key input; and (c3) resetting the current time in accordance with the key input.

15. A time reset method for an intelligent TV according to claim 13, wherein the method further comprises the step (d) of displaying information corresponding to the current time data transmitted to the information signal processor.

16. A time reset method for an intelligent TV according to claim 15, wherein said displaying step (d) displays information corresponding to the current time data in accordance with a time information display request key input.

17. A time reset method for an intelligent TV according to claim 14, said method further comprising the step of displaying information corresponding to the current time data in accordance with a time information display request key input.

* * * * *